United States Patent

Schaeffer

Patent Number: 6,066,405
Date of Patent: May 23, 2000

[54] NICKEL-BASE SUPERALLOY HAVING AN OPTIMIZED PLATINUM-ALUMINIDE COATING

[75] Inventor: Jon C. Schaeffer, Milford, Ohio

[73] Assignee: General Electric Company, Cincinnati, Ohio

[21] Appl. No.: 08/577,071

[22] Filed: Dec. 22, 1995

[51] Int. Cl.$^7$ .............. B32B 15/04; B32B 5/14; C23C 28/00; B63H 11/00

[52] U.S. Cl. .................. 428/547; 428/610; 428/680; 428/332; 428/621; 427/250; 416/241 R

[58] Field of Search .................. 427/252, 250, 427/253, 419.1; 428/544, 623, 610, 547, 621, 699, 632, 680, 650, 670, 332; 148/527, 512; 29/889; 416/241 R

[56] References Cited

U.S. PATENT DOCUMENTS

| | | | |
|---|---|---|---|
| 3,677,789 | 7/1972 | Bungardt et al. | 117/22 |
| 3,692,554 | 9/1972 | Bungardt et al. | 117/22 |
| 3,819,338 | 6/1974 | Bungardt et al. | 29/194 |
| 3,979,273 | 9/1976 | Panzera et al. | 204/192 |
| 4,346,137 | 8/1982 | Hecht et al. | 428/215 |
| 4,501,776 | 2/1985 | Shankar | 427/253 |
| 4,656,099 | 4/1987 | Sievers | 428/610 |
| 5,057,196 | 10/1991 | Creech et al. | 204/181.5 |
| 5,077,141 | 12/1991 | Naik et al. | 428/680 |
| 5,139,824 | 8/1992 | Liburdi et al. | 427/252 |
| 5,238,752 | 8/1993 | Duderstadt et al. | 428/623 |
| 5,292,594 | 3/1994 | Liburdi et al. | 428/650 |
| 5,427,866 | 6/1995 | Nagaraj et al. | 428/610 |
| 5,482,578 | 1/1996 | Rose et al. | 148/516 |
| 5,492,726 | 2/1996 | Rose et al. | 427/252 |
| 5,650,235 | 7/1997 | McMordie et al. | 428/600 |
| 5,658,614 | 8/1997 | Basta et al. | 427/253 |
| 5,667,663 | 9/1997 | Rickerby et al. | 205/170 |

FOREIGN PATENT DOCUMENTS

| | | |
|---|---|---|
| 0 587 341 A1 | 3/1994 | European Pat. Off. . |
| 0 733 723 A1 | 9/1996 | European Pat. Off. . |
| 95/23243 | 8/1995 | WIPO . |

*Primary Examiner*—Deborah Jones
*Assistant Examiner*—Michael LaVilla
*Attorney, Agent, or Firm*—Andrew C. Hess; David L. Narciso

[57] ABSTRACT

A nickel-base superalloy substrate includes a surface region having an integrated aluminum content of from about 18 to about 24 percent by weight and an integrated platinum content of from about 18 to about 45 percent by weight, with the balance components of the substrate. The substrate is preferably a single-crystal advanced superalloy selected for use at high temperatures. The substrate may optionally have a ceramic layer deposited over the platinum-aluminide region, to produce a thermal barrier coating system. The platinum-aluminide region is produced by diffusing platinum into the substrate surface, and thereafter diffusing aluminum into the substrate surface.

9 Claims, 3 Drawing Sheets

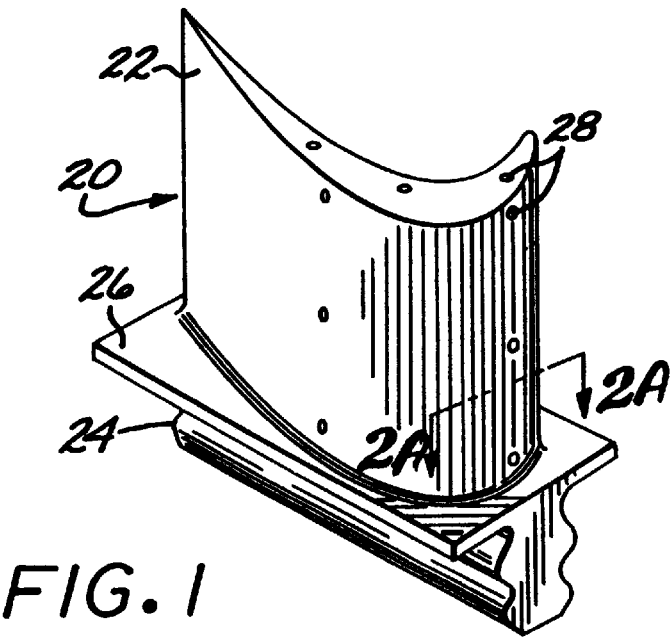
FIG. 1
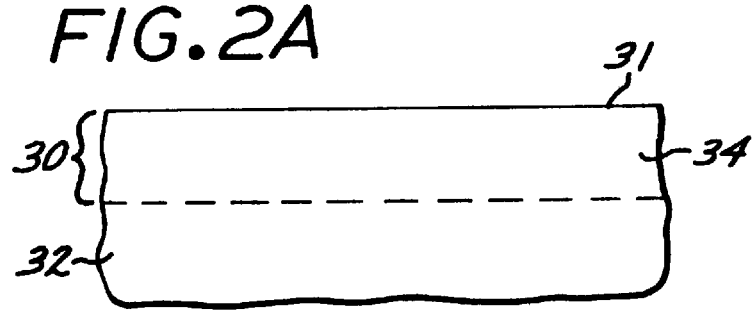
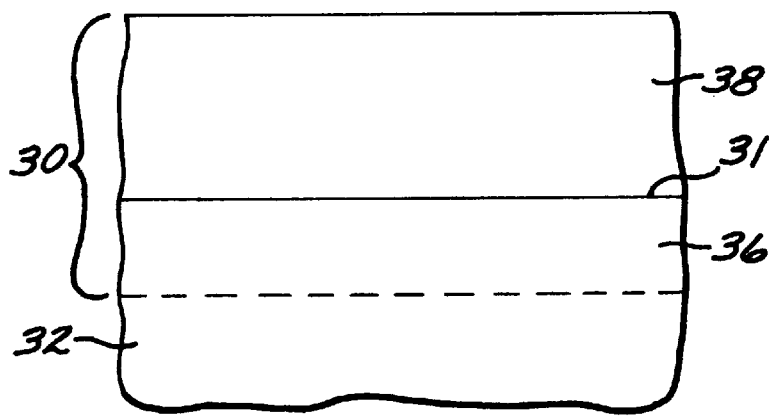

NICKEL-BASE SUPERALLOY HAVING AN OPTIMIZED PLATINUM-ALUMINIDE COATING

BACKGROUND OF THE INVENTION

This invention relates to nickel-base superalloys used in high-temperature applications, and, more particularly, to articles made of such materials and having an optimized platinum-aluminide protective coating.

In an aircraft gas turbine (jet) engine, air is drawn into the front of the engine, compressed by a shaft-mounted compressor, and mixed with fuel. The mixture is combusted, and the resulting hot exhaust gases are passed through a turbine mounted on the same shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust gas temperature. However, the maximum temperature of the exhaust gases is normally limited by the materials used to fabricate the turbine vanes and turbine blades of the turbine. In current engines, the turbine vanes and blades are made of nickel-based superalloys and can operate at temperatures of up to 1900–2100° F.

Many approaches have been used to increase the operating temperature limit of the turbine blades and vanes. The compositions and processing of the materials themselves have been improved. Physical cooling techniques are used. In one widely used approach, internal cooling channels are provided within the components, and cool air is forced through the channels during engine operation.

In another approach, a metallic protective coating or a ceramic/metal thermal barrier coating system is applied to the turbine blade or turbine vane component, which acts as a substrate. The metallic protective coating is useful in intermediate-temperature applications. One known type of metallic protective coating is a platinum-aluminide coating that is formed by depositing platinum and aluminum onto the surface of the substrate and then diffusing these constituents into the surface of the substrate.

The thermal barrier coating system is useful in high-temperature applications. The thermal barrier coating system includes a ceramic thermal barrier coating that insulates the component from the hot exhaust gas, permitting the exhaust gas to be hotter than would otherwise be possible with the particular material and fabrication process of the component. Ceramic thermal barrier coatings usually do not adhere well directly to the superalloys used in the substrates. Therefore, an additional metallic layer called a bond coat is placed between the substrate and the thermal barrier coating. The bond coat is usually made of a nickel-containing overlay alloy, such as a NiCrAlY or a NiCoCrAlY, of a composition more resistant to environmental damage than the substrate. The bond coat may also be made of a diffusional nickel aluminide or platinum aluminide, whose surface oxidizes to a protective aluminum oxide scale.

While superalloys coated with such metallic protective coatings or ceramic/metal thermal barrier coating systems do provide substantially improved performance over uncoated materials, there remains room for improvement in elevated temperature performance and environmental resistance. There is an ongoing need for improved metallic protective coatings and bond coats to protect nickel-base superalloys in elevated-temperature applications. This need has become more acute with the development of the newest generation of nickel-base superalloys, inasmuch as the older protective coatings are often not satisfactory with these materials. The present invention fulfills this need, and further provides related advantages.

SUMMARY OF THE INVENTION

The present invention provides a metallic overcoating for nickel-base superalloys. The overcoating is a platinum-aluminide useful as a metallic protective coating or as a bond coat for the thermal barrier coating system. The overcoating is in the form of a surface region that is well bonded to the substrate. The platinum-aluminide coating has good elevated-temperature stability and resistance to environmental degradation in typical gas-turbine engine applications.

In accordance with the invention, an article having a platinum-aluminide surface region comprises a substrate having a nickel-base alloy substrate bulk composition and a substrate surface, and a surface region at the substrate surface. The surface region has an integrated aluminum content of from about 18 to about 24 percent by weight and an integrated platinum content of from about 18 to about 45 percent by weight, balance components of the substrate bulk composition totalling 100 weight percent. Preferably, the surface region has an integrated aluminum content of from about 21 to about 23 percent by weight and an integrated platinum content of from about 30 to about 45 percent by weight. All compositions stated herein for surface regions are determined by an integration technique to be discussed subsequently, which effectively determines an averaged composition throughout the surface region. Optionally, a ceramic layer overlies the surface region, to produce a thermal barrier coating system.

A method for preparing such an article comprises the steps of providing a substrate having a nickel-base alloy substrate bulk composition and a substrate surface, depositing a layer of platinum upon the substrate surface, and diffusing platinum from the layer of platinum into the substrate surface. The method further includes providing a source of aluminum and diffusing aluminum from the source of aluminum into the substrate surface for a time sufficient to produce a surface region at the substrate surface. The surface region has an integrated aluminum content of from about 18 to about 24 percent by weight and an integrated platinum content of from about 18 to about 45 percent by weight, as determined by integration, balance components of the substrate bulk composition totalling 100 weight percent. Optionally, the substrate and surface region may be annealed, and/or a ceramic layer may be deposited overlying the surface region.

Platinum-aluminide protective surface regions have been known previously, but the present approach provides an optimized platinum-aluminide coating whose elevated-temperature performance and environmental resistance are improved as compared with prior platinum-aluminide coatings. Moreover, the platinum-aluminide coating of the invention can be utilized with advanced nickel-base superalloys without excessive coating growth during service, surface roughening, production of undesirable phases during service, or reduced stress rupture capabilities. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a perspective view of a gas turbine component;

FIG. 2A is a schematic sectional view through the component of FIG. 1 along line 2—2, showing one embodiment of the invention;

FIG. 2B is a schematic sectional view through the component of FIG. 1 along line 2—2, showing a second embodiment of the invention;

DETAILED DESCRIPTION OF THE INVENTION

Figure 3:
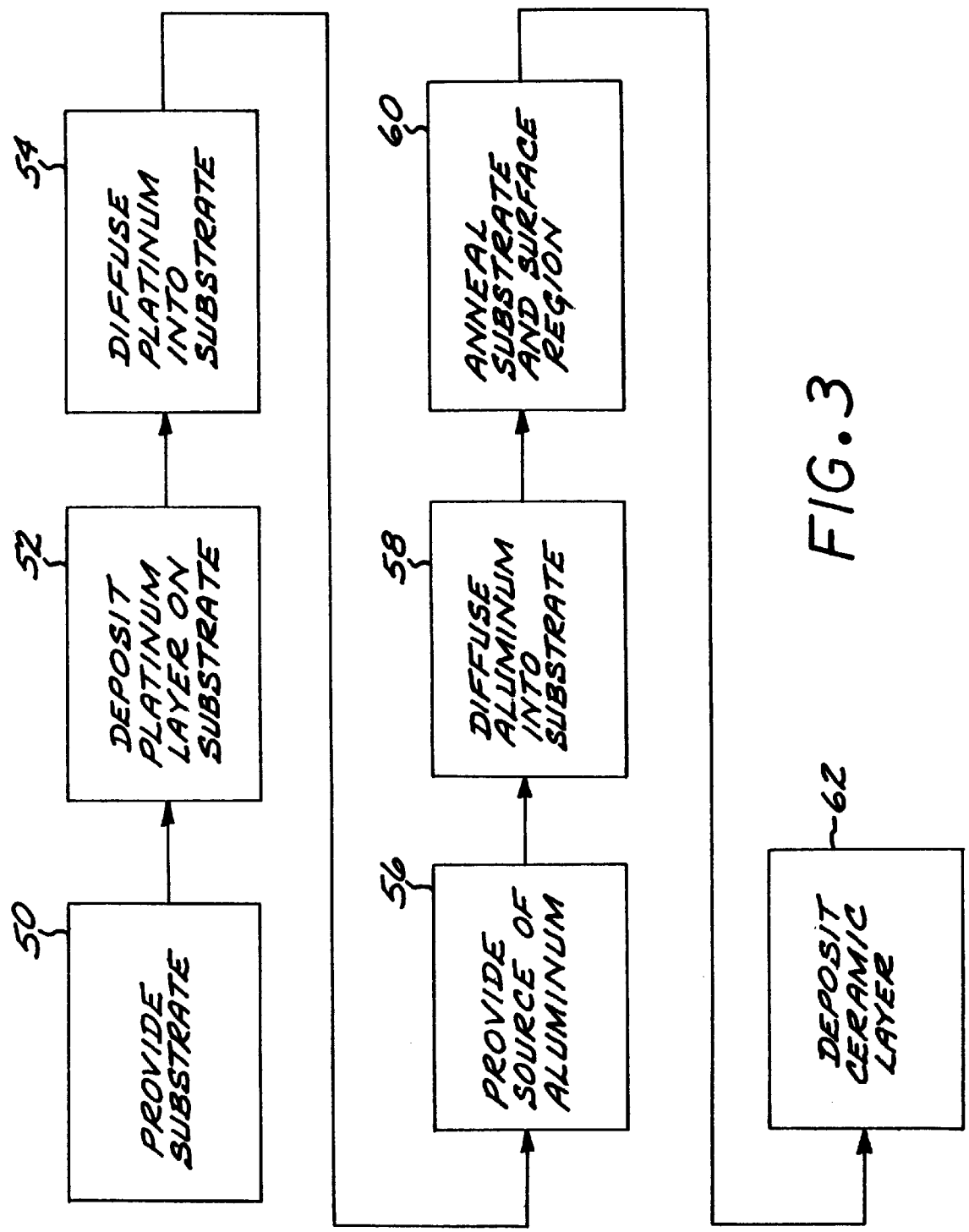
FIG. 3 is a block flow diagram for a method for applying a protective coating to a substrate.

FIG. 1 depicts a component of a gas turbine engine such as a turbine blade or turbine vane, in this case depicted as a turbine blade 20. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of cooling channels optionally extend through the interior of the airfoil 22, ending in openings 28 in the surface of the airfoil 22. A flow of cooling air is directed through the cooling channels, to reduce the temperature of the airfoil 22.

The airfoil 22 of the turbine blade 20 is protected by a protective coating 30, two embodiments of which are illustrated in FIG. 2A and FIG. 2B. In each case, the protective coating 30 is present at a surface 31 of the turbine blade 20, which serves as a substrate 32 for the protective coating 30.

In the embodiment of FIG. 2A, the protective coating 30 comprises a platinum-aluminide region 34 located at the surface 31 of the substrate 32. In the embodiment of FIG. 2B, the protective coating 30 comprises a platinum-aluminide region 36 at the surface 31 of the substrate 32 and a ceramic thermal barrier layer 38 overlying the platinum-aluminide region 36. The protective coating 30 shown in FIG. 2B, including the metallic region 36 (in this context termed a bond coat) and the ceramic layer 38, is sometimes termed a thermal barrier coating system. The two platinum-aluminide regions 34 and 36 may be of the same or different structures and compositions, within the scope of the invention. The platinum-aluminide regions 34 and 36 are preferably from about 0.0015 inches to about 0.004 inches thick, most preferably about 0.0025 inches thick.

FIG. 3 is a block flow diagram for a preferred method of preparing the protective coatings of FIGS. 2A and 2B. The substrate 32 is provided, numeral 50. The substrate is a nickel-base superalloy, preferably an advanced second or third generation, nickel-base single-crystal superalloy containing substantial amounts of both aluminum and rhenium. The substrate is substantially single crystal in form, although small amounts of polycrystalline material are tolerated. The aluminum content is from about 5 to about 16 weight percent, most preferably about 6–7 weight percent, in such advanced superalloys. At least about 5 weight percent aluminum is present in order to produce a sufficiently high volume fraction of the strengthening γ' phase. The rhenium content is from about 1 to about 8 weight percent, most preferably from about 2.5 to about 6 weight percent, in such advanced superalloys. A most preferred substrate is a single-crystal substrate made of alloy RN5, having a composition, in weight percent, of 7.5 percent cobalt, 7 percent chromium, 6.2 percent aluminum, 6.5 percent tantalum, 5 percent tungsten, 1.5 percent molybdenum, 3 percent rhenium, balance nickel. Optionally, some yttrium and/or hafnium may be present. The approach of the invention is also operable with other advanced alloy substrates such as alloy RN6, having a composition, in weight percent, of 12.5 percent cobalt, 4.5 percent chromium, 6 percent aluminum, 7.5 percent tantalum, 5.8 percent tungsten, 1.1 percent molybdenum, 5.4 percent rhenium, 0.15 percent hafnium, balance nickel; and alloy R142, having a composition, in weight percent, of 12 percent cobalt, 6.8 percent chromium, 6.2 percent aluminum, 6.4 percent tantalum, 4.9 percent tungsten, 1.5 percent molybdenum, 2.8 percent rhenium, 1.5 percent hafnium, balance nickel.

The optimized platinum-aluminide coating of the invention exhibits excellent performance on a wide variety of substrate materials, but this improved performance is particularly important for these advanced single-crystal nickel-base alloy substrates. These advanced single crystal alloy substrates have higher aluminum contents than prior nickel-base superalloys, resulting in a larger amount of γ' phase, about 60–70 volume percent, than prior nickel-base superalloys. They are used at higher operating temperatures, over 2000° F., than prior nickel-base superalloy substrates, and diffusional effects are accordingly more important. The platinum-aluminide coating of the invention does not experience excessive coating growth, surface roughening, production of undesirable phases during service, or reduced stress rupture capabilities during service at such high temperatures. Accordingly, the combination of such an advanced single-crystal, nickel-base alloy substrate and the platinum-aluminide coating described next is the most preferred embodiment of the invention. The platinum-aluminide coating is not limited to use on such advanced single-crystal superalloys, however.

A layer of platinum is deposited on the surface of the substrate 32 as it then is presented, numeral 52. The layer of platinum is preferably deposited by electroplating, but other operable techniques such as sputtering and metallo-organic chemical vapor deposition may also be used. The layer of platinum is desirably about 0.0003 inches thick.

Platinum from the layer of platinum is diffused into the surface of the substrate by heating the substrate and the deposited layer of platinum, numeral 54. The preferred diffusion treatment is 2 hours at 1800–2000° F. The steps 52 and 54 may be conducted simultaneously or serially.

A source of aluminum is provided, numeral 56, by any operable technique. Preferably, a hydrogen and a halide gas is contacted with aluminum metal or an aluminum alloy to form the corresponding aluminum halide gas. The aluminum halide gas is contacted to the previously deposited platinum layer overlying the substrate, depositing an aluminum layer over the platinum substrate. The reactions occur at elevated temperature so that aluminum atoms transferred to the surface diffuse into the surface of the platinum-enriched region and the substrate, numeral 58. The steps 56 and 58 are therefore typically conducted simultaneously.

The temperature of the treatment, the source composition, the exposure time, and the quantity of aluminum-source gas determine the amount of aluminum transferred to the substrate and diffused into the substrate. The activity of the aluminum is determined with a pure nickel foil 0.025 millimeters thick that is placed in the aluminizing reactor at the same locations where substrates are to be placed. Complications associated with the measurement of aluminum in multicomponent systems are thereby avoided. The foil is processed in the reactor so that the foil saturates with aluminum. The aluminum content of the foil is measured by acid digestion and analysis with a suitable method such as inductively coupled plasma emission spectroscopy. From these measurements, the processing of the aluminizing treatment was determined. The preferred processing produces an activity of between 40 and 50 atomic percent in a pure nickel foil. In a preferred approach, the aluminizing and diffusion treatment is accomplished at a temperature of 1925–2050° F. for 4–16 hours.

After the diffusion treatment is complete, the chemical compositions of the platinum-aluminide region 34, 36 and the portion of the substrate 32 immediately adjacent to the platinum-aluminum region 34, 36 vary as a function of depth below the surface. The aluminum content and the platinum content of the platinum-aluminum region 34, 36 are relatively high adjacent to the surface 31, and decrease with increasing depth into the region 34, 36 and the substrate 32. The remainder of the composition, totalling 100 weight percent, is formed of components of the bulk composition of the substrate alloy, which is high at a large depth below the surface 31 and decreases to a lower value immediately adjacent to the surface 31.

Because of this variation of composition with depth, the compositions of surface regions are measured by an integration method. The coated substrate is sectioned perpendicular to the surface. The weight percent of aluminum, platinum, and other elements of interest as a function of distance from the surface is determined by any technique that provides local compositions, such as an electron microprobe with a wavelength dispersive spectrometer or energy dispersive spectrometer (in conjunction with appropriate calibration standards). Measurements are taken with an electron raster that produces at least a 5 micrometer by 5 micrometer window. Such compositional measurement techniques are known in the art. Compositional measurements are taken at locations starting within 2–3 micrometers of the outer exposed surface, and increasing depth increments of 5 micrometers or less from the prior measurement. The weight percent content of the element of interest is plotted as a function of distance from the outer exposed surface, up to a maximum distance that serves as the upper limit of integration. The upper limit of the integration is selected as the distance where the weight percent of aluminum has decreased to 18 percent from the higher values closer to the surface, because below 18 percent aluminum the β-NiAl is not stable. The area under the curve is determined by any appropriate technique such as a trapezoidal approximation, and divided by the value of the upper limit of integration.

Extensive testing, to be described in greater detail subsequently, was undertaken to determine the characteristics, properties, and processing of the optimum platinum-aluminum region 34, 36. The result is that the region 34, 36 has an integrated composition of from about 18 to about 24 weight percent aluminum and from about 18 to about 45 weight percent platinum. More preferably, the integrated composition is from about 21 to about 23 weight percent aluminum and from about 30 to about 45 weight percent platinum. The balance of the composition is interdiffused components of the substrate, principally nickel, cobalt, and chromium, so that the total of aluminum, platinum, and the diffused components composition is 100 percent.

This region 34, 36 is a single-phase, relatively ductile composition of aluminum, platinum, nickel, and the diffused components of the substrate. In the preferred approach, the region 34, 36 is about 0.0025 inches thick.

The process of FIG. 3 described to this point may optionally be followed by either or both of two additional processing steps. The substrate 32 and interdiffused region 34, 36 may be annealed to stress relieve the interdiffused region 34, 36, numeral 60. This annealing procedure, while widely used for some protective coatings, has not been found necessary with the present approach. If it is used, a preferred annealing treatment is a temperature of 1800–2000° F. for a time of ¼ to 2 hours.

A ceramic layer may optionally be deposited over the surface 31 of the substrate 30, numeral 62, if the final structure is to be a thermal barrier coating system of the type depicted in FIG. 2B. The ceramic layer for a thermal barrier coating 38 is preferably yttria-stabilized zirconia (YSZ) having a composition zirconia and about 6–8 percent by weight yttria, and about 0.005–0.015 inches thick The YSZ is deposited by any operable technique, most preferably electron beam physical vapor deposition.

Figure 4:
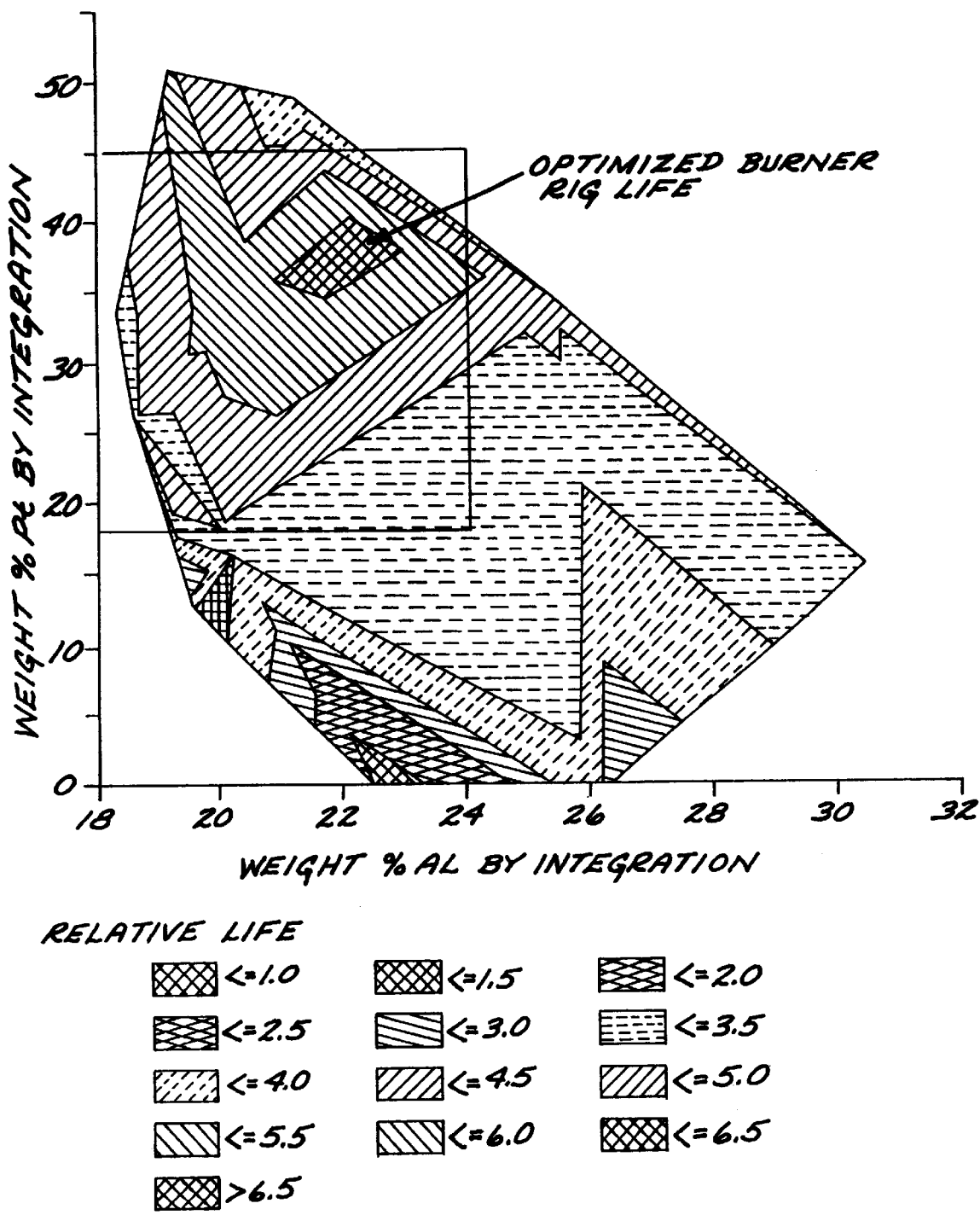
FIG. 4 is a graph illustrating coating performance as a function of composition of the coating.

Coatings of a variety of platinum-aluminum region compositions were prepared by the preferred approach described above using RN5 substrates. The coated specimens were tested in burner rigs in a high-velocity 0.5 ppm salt environment at 2150° F. The lives of the coated specimens were determined in hours of exposure per mil (0.001 inch) of coating. FIG. 4 depicts the results of these tests. There is a distinct region of significantly improved performance, for platinum-aluminum regions having an integrated aluminum content of from about 18 to about 24 percent by weight and an integrated platinum content of from about 18 to about 45 percent by weight, balance components of the substrate bulk composition. Particularly desirable results are obtained for an optimum compositional range wherein the integrated aluminum content of the surface region is from about 21 to about 23 percent by weight and the integrated platinum content of the surface region is from about 30 to about 45 percent by weight. Outside of these limits, the protection afforded by the surface region decreases.

This invention has been described in connection with specific embodiments and examples. However, those skilled in the art will recognize various modifications and variations of which the present invention is capable without departing from its scope as represented by the appended claims.

What is claimed is:

1. An article having a platinum-aluminide surface region, comprising:

a substrate having a nickel-base superalloy substrate bulk composition and a substrate surface; and a surface region at the substrate surface and extending from the substrate surface into the substrate to a distance defined by an upper limit of integration that is the distance where a weight percent of aluminum has decreased to 18 percent from a higher value closer to the surface, the surface region having an integrated aluminum content of from about 18 to about 24 percent by weight and an integrated platinum content of from about 18 to about 45 percent by weight, balance components of the substrate bulk composition, wherein the sum of the integrated aluminum content, the integrated platinum content, and the components of the substrate bulk composition in the surface region total 100 percent by weight, and wherein the platinum and aluminum contents are relatively high adjacent to the substrate surface and decrease with increasing distance from the substrate surface; and a ceramic layer overlying the surface region.

2. The article of claim 1, wherein the integrated aluminum content of the surface region is from about 21 to about 23 percent by weight and the integrated platinum content of the surface region is from about 30 to about 45 percent by weight.

3. The article of claim 1, wherein the ceramic layer has a thickness of from about 0.005 inches to about 0.015 inches.

4. The article of claim 1, wherein the thickness of the surface region is from about 0.0015 to about 0.004 inches.

5. The article of claim 1, wherein the substrate is selected from the group consisting of a turbine blade and a turbine vane.

6. The article of claim 1, wherein the nickel-base superalloy substrate is substantially a single crystal and the substrate bulk composition includes from about 5 to about 16 weight percent aluminum and from about 1 to about 8 weight percent rhenium.

7. The article of claim 1, wherein the nickel-base superalloy substrate is substantially a single crystal and the substrate bulk composition is selected from the group having a composition, in weight percent, consisting of (a) 7.5 percent cobalt, 7 percent chromium, 6.2 percent aluminum, 6.5 percent tantalum, 5 percent tungsten, 1.5 percent molybdenum, 3 percent rhenium, balance nickel; (b) 12.5 percent cobalt, 4.5 percent chromium, 6 percent aluminum, 7.5 percent tantalum, 5.8 percent tungsten, 1.1 percent molybdenum, 5.4 percent rhenium, 0.15 percent hafnium, balance nickel; and (c) 12 percent cobalt, 6.8 percent chromium, 6.2 percent aluminum, 6.4 percent tantalum, 4.9 percent tungsten, 1.5 percent molybdenum, 2.8 percent rhenium, 1.5 percent hafnium, balance nickel.

8. An article prepared by a method comprising the steps of:

providing a substrate having a nickel-base superalloy substrate bulk composition and a substrate surface; thereafter depositing a layer of platinum upon the substrate surface; thereafter diffusing platinum from the layer of platinum into the substrate surface; thereafter providing a source of aluminum; thereafter diffusing aluminum from the source of aluminum into the substrate surface for a time sufficient to produce a surface region at the substrate surface and extending from the substrate surface to a distance defined by an upper limit of integration that is the distance where the weight percent of aluminum has decreased to 18 percent from a higher value closer to the surface, the surface region having an integrated aluminum content of from about 18 to about 24 percent by weight and an integrated platinum content of from about 18 to about 45 percent by weight, balance components of the substrate bulk composition; and thereafter depositing a ceramic layer overlying the substrate surface.

9. An article prepared by a method comprising the steps of providing a substrate having a nickel-base superalloy substrate bulk composition and a substrate surface; thereafter depositing a layer of platinum about 0.0003 inches thick upon the substrate surface; thereafter heating the substrate and layer of platinum to a temperature of about 1800–2000° F. for a time of about 2 hours; thereafter providing a source of aluminum in contact with the substrate surface, the source having an activity of about 40 to about 50 atomic percent as measured in a pure nickel foil; simultaneously heating the substrate surface and source of aluminum to a temperature of about 1925–2050° F. for a time of from about 4 to about 16 hours so that aluminum interdiffuses from the source of aluminum into the substrate surface to form an interdiffused region of platinum, aluminum, and the substrate material; and depositing a ceramic layer overlying the substrate surface.

* * * * *